(12) United States Patent
Kerstan et al.

(10) Patent No.: US 11,940,378 B2
(45) Date of Patent: Mar. 26, 2024

(54) SPECTROMETER SYSTEM AND METHOD FOR TESTING OF SAME

(71) Applicant: CARL ZEISS SPECTROSCOPY GMBH, Jena (DE)

(72) Inventors: Felix Kerstan, Jena (DE); Juergen Gobel, Jena (DE)

(73) Assignee: CARL ZEISS SPECTROSCOPY GMBH, Jena (DE)

( * ) Notice: Subject to any disclaimer, the term of this patent is extended or adjusted under 35 U.S.C. 154(b) by 343 days.

(21) Appl. No.: 17/432,133

(22) PCT Filed: Dec. 18, 2019

(86) PCT No.: PCT/EP2019/086039
§ 371 (c)(1),
(2) Date: Aug. 19, 2021

(87) PCT Pub. No.: WO2020/169237
PCT Pub. Date: Aug. 27, 2020

(65) Prior Publication Data
US 2022/0187196 A1    Jun. 16, 2022

(30) Foreign Application Priority Data
Feb. 19, 2019    (DE) ............. 10 2019 104 066.3

(51) Int. Cl.
*G01N 21/27*    (2006.01)

(52) U.S. Cl.
CPC ......... *G01N 21/276* (2013.01); *G01N 21/278* (2013.01)

(58) Field of Classification Search
CPC ........ G01J 3/0202; G01J 3/021; G01J 3/0232; G01J 3/0237; G01J 3/0291; G01J 3/0297; G01J 3/42; G01N 21/276; G01N 21/278
See application file for complete search history.

(56) References Cited

U.S. PATENT DOCUMENTS 6,249,343 B1    6/2001  Wang
6,420,695 B1 *  7/2002  Grasdepot .......... G01N 21/3504
                                                  250/226

(Continued)

FOREIGN PATENT DOCUMENTS

DE        19548378 A1    7/1997
DE  10 2004 021 448 A1   11/2005

(Continued)

*Primary Examiner* — Tri T Ton
(74) *Attorney, Agent, or Firm* — Stuart H. Mayer; Kaplan Breyer Schwarz LLP

(57) ABSTRACT

A spectrometer system comprises a housing provided with a window, an illumination source, a spectrometer and a standard for internal recalibration being disposed in said housing. Specific absorption bands of a filling gas present in the housing are identified in a reference spectrum, which was recorded using the standard, wherein a wavelength characterizing the relevant identified specific absorption band is measured in each case such that measured values are obtained for the wavelengths of the absorption bands. A test spectrum is recorded by the spectrometer using the standard. The specific absorption bands of the filling gas are identified in the test spectrum, wherein a wavelength characterizing the relevant identified specific absorption band is measured in each case such that measured values are obtained for the wavelengths of the specific absorption bands.

28 Claims, 1 Drawing Sheet

(56) References Cited

U.S. PATENT DOCUMENTS

| | | | |
|---|---|---|---|
| 6,636,316 B1 * | 10/2003 | Matsumoto | G01N 21/3504 |
| | | | 356/437 |
| 2008/0290279 A1 * | 11/2008 | Juhl | G01N 21/274 |
| | | | 250/339.08 |
| 2019/0226986 A1 * | 7/2019 | Kompaniets | G01J 3/0213 |

FOREIGN PATENT DOCUMENTS

| | | |
|---|---|---|
| DE | 10 2004 048 103 A1 | 4/2006 |
| DE | 698 36 166 T2 | 2/2007 |
| DE | 10 2007 029 405 A1 | 1/2009 |
| DE | 10 2018 103 509 B3 | 12/2018 |
| EP | 2092296 B1 | 3/2016 |

* cited by examiner

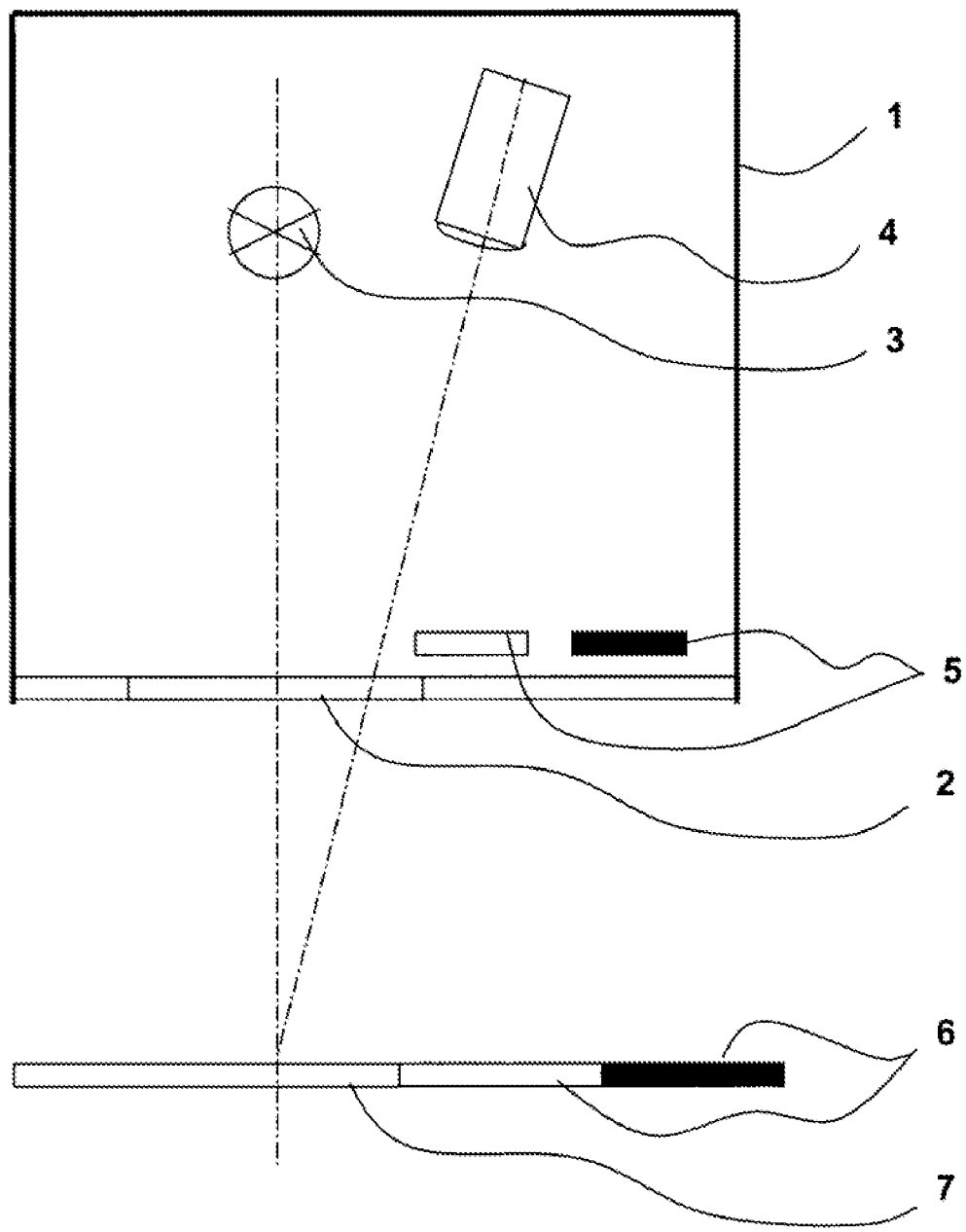

SPECTROMETER SYSTEM AND METHOD FOR TESTING OF SAME

BACKGROUND OF THE INVENTION

The present invention relates to a method for testing a spectrometer system, which is embodied, for example, as a content analysis system for agricultural products or foodstuff. Additionally, the method can also be embodied to recalibrate the spectrometer system. Furthermore, the invention relates to a spectrometer system.

DE 10 2007 029 405 A1 teaches a wavelength and intensity standard for spectrometers, said standard being provided for calibrating and testing measuring heads of spectrometers in particular. The standard comprises a mount and a plate body made of a transparent plastic with great solidity and dimensional stability over a great temperature range arranged in said mount. The plastic has pronounced absorption bands over the entire NIR range and such a chemical structure and composition that should ensure a high moisture barrier, which is reliable and stable over time, against taking in water and emitting water. Advantageously the plate body consists of an amorphous, transparent copolymer on the basis of cyclic and/or linear olefins.

DE 698 36 166 T2 relates to a wavelength standard for the visible range and the infrared range, for use when analyzing and identifying materials. The wavelength standard comprises a concrete mixture with a rare earth oxide distributed in the matrix.

DE 10 2004 021 448 A1 discloses a spectrometric reflection measuring head with internal recalibration, which consists of a housing provided with a window, an illumination source and an optical assembly for collecting the measurement light and coupling the latter into a light guide being arranged in said housing. The housing has connections to a voltage source, to a control and evaluation unit, and to a spectrometer. Additionally, at least two standards for internal recalibration are present in the housing, said standards being able to be electively pivoted into the beam path of the reflection measuring head for the purposes of capturing the measurement data for the recalibration.

DE 10 2004 048 103 A1 has disclosed an arrangement for determining the constituent parts of harvested agricultural products. This arrangement comprises a spectrometric measuring head which consists of a housing provided with a window, an illumination source, a spectrometer arrangement and at least two standards for internal recalibration being present in said housing. The standards can be pivoted into the beam path of the measuring head in such a way that the entire measurement light emanating from the illumination source is used for recalibration purposes.

DE 10 2018 103 509 B3 has disclosed a method for sample-appropriate measurement using a mobile content analysis system which comprises a housing with a window, an interface for an external reference unit, a display and operating unit, a light source, an optical spectrometer, a camera, an internal reference unit and an electronic control unit. This method comprises checking the plausibility of a chosen calibration product, an incorrect selection being signaled and a renewed selection of an alternative calibration product being initiated. The temperature and the relative humidity at the measurement location and in the interior of the housing are captured and monitored while the measurement values are being recorded, with impermissible deviations from temperature values and relative humidity levels specified by the calibration product being signaled by means of the display and operating unit.

The cited prior art discloses, inter alia, the use of spectroscopy as in-line and at-line measurement technology for agricultural products and foodstuffs. Moisture values and content of agricultural products and foodstuffs can be determined with the aid of NIR spectroscopy. The appropriate measuring devices can have a stationary or mobile embodiment. Since NIR spectroscopy is an optical measuring method, the accuracy of the measurement depends substantially on an interface to a sample, i.e., on an optical measurement window. The measurement window can become dirty or scratched during use. Additionally, the measurement window can be machined down by material flow when used in an agricultural device such that it needs to be replaced. Consequently, there are changes in the capability of the measurements, and so a cyclical recalibration using an external reference is needed, rendering increased outlay necessary.

US 2008/0290279 A1 discloses a method for normalizing an IR spectrometer. The method is based on utilizing spectral lines of the air naturally occurring in the spectrometer. By way of example, the absorption band of $CO_2$ at 2350 $cm^{-1}$ is utilized. A deviation between the measured wavelength of the absorption band and the reference value is determined for the purposes of calibrating the spectrometer.

EP 2 092 296 B1 describes a method for optical spectroscopic measurements, in which use is made of a measuring head with an illumination source, a converging optical unit and internal reference. The internal reference is illuminated by the illumination source and observed through the converging optical unit.

U.S. Pat. No. 6,249,343 discloses a wavelength standard which utilizes absorption lines of gas, for example water vapor, in the region of 1.3 µm.

SUMMARY OF THE INVENTION

Proceeding from the prior art, the object of the present invention consists of being able to test and optionally recalibrate a spectrometer system without requiring an external wavelength standard or a line lamp to this end.

The specified object is achieved by a method as claimed in appended claim 1 and by a spectrometer system as claimed in appended additional independent claim 15.

The method according to the invention serves to test a spectrometer system. The spectrometer system preferably is an optical measuring system for ascertaining content on a spectroscopic basis. It preferably serves to ascertain content of agricultural products or foodstuffs. The spectrometer system is preferably arranged on an agricultural machine, for example a forage harvester, and is embodied for continuously testing an agricultural product. The spectrometer system preferably permits a measurement in the UV range, in the visual range and/or in the NIR range. The spectrometer system is preferably embodied as a polychromator. The spectrometer system is preferably embodied for a reflection measurement.

The spectrometer system comprises a housing provided with a window. The window forms a measurement window of the spectrometer system. An illumination source, a spectrometer and at least one standard for internal recalibration are arranged in the housing. The illumination source is preferably formed by a broadband thermal emitter. The illumination source is preferably formed by an infrared emitter, by a halogen lamp or by an LED-based light source.

The at least one standard is a physical reference for recalibrating the spectrometer system. The at least one standard is in particular a wavelength standard which has a reference spectrum. Preferably, the at least one standard is furthermore embodied as an intensity standard. The standard is preferably embodied as a white standard such that it forms a white reference. Preferably two of the standards for internal recalibration are arranged in the housing. Here, these are preferably a white standard and a black standard. The standards are preferably electively mechanically pivotable into a beam path extending from the spectrometer to the window. The respective standard is then illuminated with light from the illumination source, the standard reflecting said light to the spectrometer.

The spectrometer system preferably comprises a control and measurement signal processing unit in the form of a computing unit. The control and measurement signal processing unit preferably comprises a graphical user interface, for example in the form of a touchscreen. Additionally, the control and measurement signal processing unit preferably comprises data interfaces, which preferably have a wireless embodiment.

By way of example, the spectrometer system is calibrated using external standards or external references. By way of example, this calibration is implemented within the scope of a factory acceptance test. According to the invention, a reference spectrum is recorded with the spectrometer using the standard arranged in the housing following the calibration of the spectrometer system. To this end, the standard is illuminated by the illumination light source and the light reflected by the standard is recorded by the spectrometer. The reference spectrum is preferably recorded immediately after the calibration of the spectrometer system such that a very high accuracy of the reference spectrum can be assumed.

A fill gas with absorption bands is present in the housing. Since the beam path of the light from the illumination source and of the light reflected by the standard run through the fill gas, the specific absorption bands of the fill gas are identifiable in the reference spectrum. According to the invention, the specific absorption bands of the fill gas are detected and identified in the reference spectrum. At least one wavelength characterizing the respective identified specific absorption band is measured in each case such that measurement values are obtained for the wavelengths of the identified specific absorption bands.

A test spectrum is recorded by the spectrometer using the standard for test purposes and optionally for an internal recalibration. This is implemented, in particular, if numerous samples were measured by the spectrometer system and/or a relevant time period has elapsed following the calibration using the external standards or references. The test spectrum is recorded in the same way as the reference spectrum.

According to the invention, the specific absorption bands of the fill gas are detected and identified in the test spectrum. At least one wavelength characterizing the respective identified specific absorption band is measured in each case such that measurement values are obtained for the wavelengths of the identified specific absorption bands.

In a further step of the method, a test is carried out as to whether the measurement values of the wavelengths of the specific absorption bands of the fill gas identified in the test spectrum deviate by no more than a specified measure from the measurement values of the wavelengths of the specific absorption bands of the fill gas identified in the reference spectrum. The specified measure defines when the inaccuracy of the measurement with the spectrometer system is so large that the required accuracy of the spectrometer system is no longer achieved. If the measurement values of the wavelengths of the specific absorption bands of the fill gas identified in the test spectrum deviate by no more than the specified measure from the measurement values of the wavelengths of the specific absorption bands of the fill gas identified in the reference spectrum, the test of the spectrometer system is positive. Otherwise the test is negative.

A particular advantage of the method according to the invention consists of facilitating a fast test of the spectrometer system without much outlay without needing external references or standards to this end. Instead, the internally present standard and the specific absorption bands of the fill gas present as a matter of principle serve as a reference.

BRIEF DESCRIPTION OF THE DRAWING

FIG. 1 shows a spectrometer system according to the invention.

DETAILED DESCRIPTION OF THE INVENTION

FIG. 1 shows a spectrometer system according to the invention. This spectrometer system is formed by a spectrometric measuring head that comprises a housing 1 which is provided with a window 2 and in which are arranged an illumination source 3, a spectrometer 4, and two internal standards 5. Outside the housing 1, there are two external standards 6 for calibrating and a sample 7 to be analyzed.

In preferred embodiments of the invention, the fill gas comprises suspended water in the form of water vapor such that the water forms humidity. In practice, this precondition is satisfied in virtually all applications. In a range from 0° C. to 70° C., the humidity has a saturation which is preferably at least 10%; this represents a small value but nevertheless is sufficient for identifying absorption bands. The specific absorption bands of the water vapor in the reference spectrum and in the test spectrum are identified accordingly. Preferably, at least one specific absorption band of water vapor located in the wavelength range between 1300 nm in 2050 nm is identified in the reference spectrum and in the test spectrum. Preferably, a plurality of specific absorption bands of water vapor located in the wavelength range between 1300 nm and 2050 nm are identified in the reference spectrum and in the test spectrum. However, the fill gas can also be a different gas or a protective gas, or the specific absorption bands can be brought about by the other components of the fill gas.

The standard arranged in the housing is preferably pivotable into a beam path running from the spectrometer to the window. In preferred embodiments of the invention, the standard for recording the reference spectrum and for recording the test spectrum is pivoted into this beam path in each case, preferably in a manner brought about by an actuator such that this process can be implemented in automated fashion.

In preferred embodiments of the invention, the measurement values of the wavelengths of the specific absorption bands of the fill gas identified in the test spectrum and the measurement values of the wavelengths of the specific absorption bands of the fill gas identified in the reference spectrum are determined by a 3-point interpolation. The test spectrum and the reference spectrum are processed with a resolution of preferably at most 0.1 nm in the wavelength range, which is preferably implemented by processing the test spectrum and the reference spectrum in a sub pixel range. As a result, an accuracy of the spectrometer system, which is ±1 nm, can be tested. By way of example, this is advantageous if the spectrometer system is embodied as a process spectrometer system on an agricultural machine, such as a forage harvester, where the spectrometer system is exposed to great shock and vibration loads over a long period of time.

The method according to the invention preferably comprises further steps which are carried out during the intended operation of the spectrometer system, i.e., while measuring a sample, and which serve to communicate the reliability of measurement values to the user of the spectrometer system. In one step, a spectrum of the sample is initially recorded using the spectrometer. To this end, the sample is illuminated by the illumination light source and the light reflected by the sample is recorded by the spectrometer. Specific absorption bands of the sample and, optionally, further spectral characteristics are identified in the recorded spectrum. In a further step, a wavelength characterizing the respective identified specific absorption band is measured in each case, as a result of which measurement values of the sample are obtained. A message is output, that the measurement values of the sample have an inaccuracy if the measurement values of the wavelengths of the specific absorption bands of the fill gas identified in the test spectrum deviate by more than the specified measure from the measurement values of the wavelengths of the specific absorption bands of the fill gas identified in the reference spectrum. Preferably, this message is output as marking of the measurement values in a numerical or graphical display of the measurement values. The message preferably represents a warning message, particularly for the case where the measurement values have a reduced accuracy but are still utilizable. Preferably, a further message is output if the measurement values of the wavelengths of the specific absorption bands of the fill gas identified in the test spectrum deviate by more than a further specified measure from the measurement values of the wavelengths of the specific absorption bands of the fill gas identified in the reference spectrum. This further message preferably represents an intervention message, by means of which an internal recalibration is preferably demanded or triggered.

The method according to the invention is preferably furthermore embodied for the internal recalibration of the spectrometer system, for the purposes of which it comprises further steps. Initially, there is a comparison of the measurement values of the wavelengths of the specific absorption bands of the fill gas identified in the test spectrum with the measurement values of the wavelengths of the specific absorption bands of the fill gas identified in the reference spectrum. A correction rule is determined on the basis of this comparison. This correction rule is suitable for correcting measurement values of the spectrometer so that these have a high accuracy. The correction rule is preferably formed by a correction function or by a correction factor. The correction rule is applied for the purposes of processing measurement values recorded by the spectrometer. The internal recalibration of the spectrometer can be implemented following a prompt by user and/or whenever the measurement values of the wavelengths of the absorption bands of the fill gas identified in the test spectrum deviate by more than a further specified measure from the measurement values of the wavelengths of the absorption bands of the fill gas identified in the reference spectrum.

The spectrometer system according to the invention comprises a housing provided with a window. An illumination source, a spectrometer and at least one standard for internal recalibration are arranged in the housing. The spectrometer system moreover comprises a control and measurement signal processing unit which is configured to carry out the method according to the invention. The control and measurement signal processing unit is preferably configured to carry out one of the described preferred embodiments of the method according to the invention. Incidentally, the spectrometer system according to the invention preferably also has features which are specified in conjunction with the method according to the invention.

The invention claimed is:

1. A method for testing a spectrometer system, wherein the spectrometer system comprises a housing provided with a window, an illumination source, a spectrometer and at least one standard for internal recalibration being arranged in said housing, and wherein the method comprises the following steps:
   identifying specific absorption bands of a fill gas, present in the housing, in a reference spectrum recorded by the spectrometer using the standard following the calibration of the spectrometer system, with a wavelength characterizing the respective identified specific absorption band being measured in each case such that measurement values are obtained for the wavelengths of the identified specific absorption bands;
   recording a test spectrum with the spectrometer using the standard;
   identifying the specific absorption bands of the fill gas in the test spectrum, with a wavelength characterizing the respective identified specific absorption band being measured in each case, such that measurement values are obtained for the wavelengths of the identified specific absorption bands; and
   testing whether the measurement values of the wavelengths of the specific absorption bands of the fill gas identified in the test spectrum deviate by no more than a specified measure from the measurement values of the wavelengths of the specific absorption bands of the fill gas identified in the reference spectrum, characterized in that the fill gas comprises suspended water in the form of water vapor such that the specific absorption bands of water vapor are identified in the reference spectrum and in the test spectrum.

2. The method as claimed in claim 1, wherein the humidity in the fill gas is at least 10%.

3. The method as claimed in claim 1, wherein at least one specific absorption band of water vapor located in the wavelength range between 1300 nm in 2050 nm is identified in the reference spectrum and in the test spectrum.

4. The method as claimed in claim 1, wherein the standard is formed by physical reference for recalibrating the spectrometer system, the standard being a wavelength standard which has a reference spectrum.

5. The method as claimed in claim 1, wherein the standard is embodied as an intensity standard.

6. The method as claimed in claim 1, wherein the standard is formed by a white reference.

7. The method as claimed in claim 1, wherein for the purposes of recording the reference spectrum and for the purposes of recording the test spectrum, the standard arranged in the housing is in each case pivoted into a beam path extending from the spectrometer to the window.

8. The method as claimed in claim 7, wherein two of the standards for internal recalibration are arranged in the housing, said standards being a white standard and a black standard which are electively mechanically pivoted into a beam path extending from the spectrometer to the window.

9. The method as claimed in claim 1, wherein the measurement values of the wavelengths of the specific absorption bands of the fill gas identified in the test spectrum and the measurement values of the wavelengths of the specific absorption bands of the fill gas identified in the reference spectrum are determined by a 3-point interpolation.

10. The method as claimed in claim 1, wherein the test spectrum and the reference spectrum are processed with a resolution of at most 0.1 nm in the wavelength range.

11. The method as claimed in claim 1, further comprising the following further steps:
   recording a spectrum of a sample using the spectrometer;
   identifying specific absorption bands of the sample in the recorded spectrum;
   measuring a wavelength characterizing the respective identified specific absorption band in each case, as a result of which measurement values of the sample are obtained; and
   outputting a message that the measurement values of the sample have an inaccuracy if the measurement values of the wavelengths of the specific absorption bands of the fill gas identified in the test spectrum deviate by more than the specified measure from the measurement values of the wavelengths of the specific absorption bands of the fill gas identified in the reference spectrum.

12. The method as claimed in claim 11, wherein the message is output as a marking of the measurement values in a numerical or graphical display of the measurement values.

13. The method as claimed in claim 1, wherein it is furthermore embodied to recalibrate the spectrometer system, for the purposes of which it comprises the following further steps:
   comparing the measurement values of the wavelengths of the specific absorption bands of the fill gas identified in the test spectrum with the measurement values of the wavelengths of the specific absorption bands of the fill gas identified in the reference spectrum;
   determining a correction rule on the basis of the undertaken comparison of the measurement values; and
   applying the correction rule for the purposes of processing measurement values recorded by the spectrometer.

14. A spectrometer system comprising a housing provided with a window, an illumination source, a spectrometer and at least one standard for internal recalibration being arranged in said housing, wherein the spectrometer system furthermore comprises a control and measurement signal processing unit, which is configured to carry out a method as claimed in claim 1.

15. A method for testing a spectrometer system, wherein the spectrometer system comprises a housing provided with a window, an illumination source, a spectrometer and at least one standard for internal recalibration being arranged in said housing, and wherein the method comprises the following steps:
   identifying specific absorption bands of a fill gas, present in the housing, in a reference spectrum recorded by the spectrometer using the standard following the calibration of the spectrometer system, with a wavelength characterizing the respective identified specific absorption band being measured in each case such that measurement values are obtained for the wavelengths of the identified specific absorption bands;
   recording a test spectrum with the spectrometer using the standard;
   identifying the specific absorption bands of the fill gas in the test spectrum, with a wavelength characterizing the respective identified specific absorption band being measured in each case, such that measurement values are obtained for the wavelengths of the identified specific absorption bands; and
   testing whether the measurement values of the wavelengths of the specific absorption bands of the fill gas identified in the test spectrum deviate by no more than a specified measure from the measurement values of the wavelengths of the specific absorption bands of the fill gas identified in the reference spectrum, wherein it is furthermore embodied to recalibrate the spectrometer system, for the purposes of which it comprises the following further steps:
   comparing the measurement values of the wavelengths of the specific absorption bands of the fill gas identified in the test spectrum with the measurement values of the wavelengths of the specific absorption bands of the fill gas identified in the reference spectrum;
   determining a correction rule on the basis of the undertaken comparison of the measurement values; and
   applying the correction rule for the purposes of processing measurement values recorded by the spectrometer.

16. The method as claimed in claim 15, wherein characterized in that the fill gas comprises suspended water in the form of water vapor such that the specific absorption bands of water vapor are identified in the reference spectrum and in the test spectrum.

17. The method as claimed in claim 15, wherein the humidity in the fill gas is at least 10%.

18. The method as claimed in claim 15, wherein at least one specific absorption band of water vapor located in the wavelength range between 1300 nm in 2050 nm is identified in the reference spectrum and in the test spectrum.

19. The method as claimed in claim 15, wherein the standard is formed by physical reference for recalibrating the spectrometer system, the standard being a wavelength standard which has a reference spectrum.

20. The method as claimed in claim 15, wherein the standard is embodied as an intensity standard.

21. The method as claimed in claim 15, wherein the standard is formed by a white reference.

22. The method as claimed in claim 15, wherein for the purposes of recording the reference spectrum and for the purposes of recording the test spectrum, the standard arranged in the housing is in each case pivoted into a beam path extending from the spectrometer to the window.

23. The method as claimed in claim 22, wherein two of the standards for internal recalibration are arranged in the housing, said standards being a white standard and a black standard which are electively mechanically pivoted into a beam path extending from the spectrometer to the window.

24. The method as claimed in claim 15, wherein the measurement values of the wavelengths of the specific absorption bands of the fill gas identified in the test spectrum and the measurement values of the wavelengths of the specific absorption bands of the fill gas identified in the reference spectrum are determined by a 3-point interpolation.

25. The method as claimed in claim 15, wherein the test spectrum and the reference spectrum are processed with a resolution of at most 0.1 nm in the wavelength range.

26. The method as claimed in claim 15, further comprising the following further steps:
   recording a spectrum of a sample using the spectrometer;
   identifying specific absorption bands of the sample in the recorded spectrum;

measuring a wavelength characterizing the respective identified specific absorption band in each case, as a result of which measurement values of the sample are obtained; and outputting a message that the measurement values of the sample have an inaccuracy if the measurement values of the wavelengths of the specific absorption bands of the fill gas identified in the test spectrum deviate by more than the specified measure from the measurement values of the wavelengths of the specific absorption bands of the fill gas identified in the reference spectrum.

27. The method as claimed in claim 26, wherein the message is output as a marking of the measurement values in a numerical or graphical display of the measurement values.

28. A spectrometer system comprising a housing provided with a window, an illumination source, a spectrometer and at least one standard for internal recalibration being arranged in said housing, wherein the spectrometer system furthermore comprises a control and measurement signal processing unit, which is configured to carry out a method as claimed in claim 15.

\* \* \* \* \*